3,100,772
METHOD FOR PREPARING PHENOTHIAZINE DERIVATIVES
Martin L. Kantor, Downingtown, and Samuel Tubis, Oreland, Pa., assignors to American Home Products Corporation, New York, N.Y., a corporation of Delaware
No Drawing. Filed Sept. 28, 1956, Ser. No. 612,881
8 Claims. (Cl. 260—243)

This invention relates to a new method for preparing heterocyclic compounds, specifically phenothiazine derivatives.

The present method for the preparation of phenothiazine derivatives as disclosed in numerous patents involves the alkylation of phenothiazine or ring-substituted phenothiazines with a tertiary aminoalkyl halide. The reaction is almost invariably carried out in a hydrocarbon solvent of the aromatic type, specifically benzene, toluene or xylene, with the latter apparently being the preferred solvent. The reaction is promoted by a so-called acid-binding agent, the preferred agent generally being sodamide.

In carrying out the aforesaid known procedure, it is generally found that the sodamide must first be reacted with the phenothiazine compound dissolved in xylene. This reaction is intended to replace the hydrogen in the 10-position with the alkali metal ion forming the sodio derivative, a thick insoluble mass of complex. To the thick complex thus formed is added the aminoalkyl halide in small regulated amounts with stirring. Such a reaction must be carried out at relatively high temperatures.

We have greatly improved the prior method by the discovery of a superior condensing agent and liquid medium for the reaction. It has been found that the use of an alkaline hydride with dimethyl or diethyl formamide either alone or in admixture with other solvents in place of the aromatic hydrocarbons per se either improves the yield of desired product or permits less drastic reaction temperatures. In addition, the use of dialkyl formamide simplifies the procedure since the prior formation of the alkali-metal complex is no longer necessary or desirable.

Moreover, while the prior art discloses that alkaline metal hydrides may be used as acid-binding agents with the aromatic solvents suggested, it has been found that sodium hydride is in fact inoperable as an acid-binding or condensing agent with aromatic solvents. On the other hand, the reaction proceeds easily and excellent yields are obtained when using sodium, potassium or calcium hydride in the presence of dialkyl formamide. Of these hydrides, sodium hydride is preferred because it is readily available and relatively inexpensive.

While the new medium for the reaction is preferably the dialkyl formamide alone, one may obtain good results when using organic solvent mixtures containing as low as 10% by volume of the amide. Thus, satisfactory yields are obtained even when the liquid medium comprises only about 10% to 15% dialkyl formamide and 85% to 90% by volume of aromatic hydrocarbon solvent.

The preference in using dialkyl formamide alone rather than in admixture with other solvents lies in the fact that with substantially all amide solvent the reaction will proceed at a lower temperature range than when the amide is present in minor amount. In the former case, one may operate at a temperature in the range of about 25° to about 80° C., with 25°–50° C. being the most convenient and preferred temperature range. On the other hand, where the amide is substantially below 50% by volume, a temperature of 80° C. or up to the refluxing temperature of the mixed solvents is required.

Thus, in accordance with the invention, a phenothiazine compound is reacted with a tertiary aminoalkyl halide in the presence of sodium, potassium or calcium hydride, preferably sodium hydride. The liquid medium or solvent for the reaction involves the use of dimethyl or diethyl formamide, the reaction medium being either totally amide or comprising at least about 10% but preferably no lower than 15% by volume, the more preferred solvent medium being dimethyl formamide in major amount. The reaction temperature, while preferably held low, may range from about 25° C. to the refluxing temperature of the solvent medium. When operating with the amide in major amount, the reaction will take place at a temperature in the range of about 25°–50° C.

The phenothiazine reactant is preferably a compound having the general formula

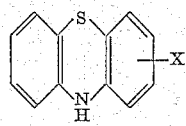

where X may represent hydrogen, a halogen such as chlorine or bromine or a lower alkyl, lower alkoxy, or lower acyl radical. These substituents do not in any way interfere with the reaction.

The tertiary aminoalkyl halide reactant may be represented by the formula

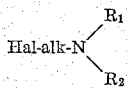

wherein Hal stands for a halogen atom, specifically chlorine or bromine with the former preferred, "alk" stands for a divalent lower alkylene radical of 2 to 6 carbon atoms, but preferably one having 3 to 4 carbon atoms, with $R_1$ and $R_2$ standing for lower alkyls, preferably methyl, ethyl or isopropyl radicals which may be joined so as to form a heterocyclic radical with the nitrogen atom, preferably a pyrrolidino or piperidino radical.

The compound formed by the aforesaid procedure have the formula

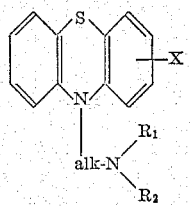

the designations X, "alk," $R_1$ and $R_2$ having the aforesaid meanings. These compounds, either in the form of the base, or the non-toxic quaternary or acid-addition salts, have pharmacological actions, notably antihistaminic, antiemetic and tranquilizing actions.

The following examples are to be taken as illustrative rather than limitative of the invention.

*Example 1*

199 g. (1 mole) of phenothiazine is dissolved in 300 ml. dimethyl formamide at 25°. The mixture is stirred mechanically and kept under a nitrogen atmosphere. 26.4 gms. (1.1 M) of sodium hydride—preferably as a 50% dispersion in mineral oil—is added portionwise. The temperature rises, and cooling is necessary to keep the temperature below 35° C. The mixture is left to react for 1 hour and at the end of this time a solution of 133.6 gms. (1.1 M) of N,N-dimethylamino-n-propyl chloride in 300 ml. toluene is added over a 1 hour period. There is little evidence of reaction at first, but the solids go into solution and cooling is necessary to keep the temperature below 35°. The mix is allowed to stir 1 hour after evidence of heat evolution ceases. The excess sodium hydride is destroyed cautiously with methanol and the reaction poured into 1 l. of 1:1 acetic acid. The toluene layer is discarded, the aqueous portion washed with toluene. Then toluene is added to the aqueous portion and the mixture basified with sodium hydroxide solution. The toluene layer is dried with potassium carbonate, concentrated and distilled in vacuo and the product, 10-(3' - dimethylaminopropyl)phenothiazine, collected in range 195–205° C. at 2–3 mm. mercury absolute.

Example 2

In place of the dimethyl formamide solvent used as described in Example 1, a solvent mixture of 85% by volume of toluene and 15% by volume of dimethyl formamide was used, the reaction being carried out under refluxing conditions.

Example 3

In a nitrogen atmosphere with stirring, 1 mole of phenothiazine is dissolved in 300 ml. dimethyl formamide at room temperature. To this is added 1.1 moles of N,N-dimethylamino-n-propyl chloride in 250 ml. toluene or xylene. This is warmed to 45°–50° C. and sodium hydride added at this temperature over 1–3 hours. The reaction is allowed to continue for 3 hours and worked up as disclosed in Example 1 to obtain 10-(3'-dimethylaminopropyl)phenothiazine.

Example 4

In a 1 liter flask, equipped with stirrer, thermometer and nitrogen inlet, 199 grams (1 mole) of phenothiazine is dissolved in 300 ml. of dry dimethyl formamide. The phenothiazine is almost completely soluble. To this solution is added 275 ml. of a 4 normal solution of 3-diethylaminopropyl chloride in toluene.

The mixture is heated to 50° C. and 26 grams (1.08 moles) of sodium hydride is added portionwise, maintaining the temperature at 50–60° C. The addition should take about 1 hour. The reaction is allowed to stir for 3 hours at 50–60° C. Any excess hydride is destroyed by the cautious addition of 10 ml. methanol, and the reaction mix is poured into 800 ml. of 20% acetic acid.

The toluene layer is separated and extracted with 150 ml. of 20% acetic acid, and discarded. The acid solutions are combined and washed once with toluene. The toluene is discarded. Fresh toluene (200 ml.) is added and caustic solution is added with cooling and stirring until the pH is 9 or above. The toluene layer is separated. The aqueous layer is extracted once more with 75 ml. of toluene and discarded. The toluene extracts are combined, given a small water wash, and concentrated. The residue is distilled yielding 240 grams (77%) of 10-(3'-diethylaminopropyl)phenothiazine.

Example 5

Following the procedure of Example 4, but using 275 ml. of a 4 normal solution of 1-dimethylamino-3-chlorobutane in toluene in place of the halogen compound disclosed, one obtains 214 grams (72%) of 10-(3'-dimethylamino-3'-methyl-n-propyl)phenothiazine distilling at 178–183° C. at about 0.05 mm. pressure.

Example 6

Following the procedure of Example 4, but using 241 grams of 2-acetyl phenothiazine and 275 ml. of a 4 normal solution of 1-dimethylamino-2-chloropropane in toluene, the reaction product obtained as a residue was dissolved in about 400 ml. acetone and 116 g. of maleic acid in 250 ml. acetone was added. The reaction mixture was heated to boiling, cooled and the desired product, namely the maleate salt of 10-(2'-methyl-2'-dimethylaminoethyl)-2-acetyl phenothiazine was crystallized out of solution. The salt was filtered, washed with acetone and dried. M.P. 121–122° C.

Example 7

Following the procedure of Example 4, but using 241 grams of 2-acetyl phenothiazine and 275 ml. of a 4 normal solution of 3-dimethylaminopropyl chloride in toluene, one obtains 180 grams (55%) of 10-(3'-dimethylaminopropyl)-2-acetyl phenothiazine distilling at 225°–240° C. at 0.3–0.5 mm. pressure.

Example 8

The process described in Example 3 was carried out except for the following change: N,N'-dimethylamino-n-propyl chloride hydrochloride salt was dissolved in water and basified to release the free base as an oil. Instead of extracting the oil into toluene or xylene and using such extract for the reaction, the oily free base was separated from the aqueous layer, dried and 1.1 mol of the substantially anhydrous N,N-dimethylamino-n-propyl chloride was added to the phenothiazine in dimethyl formamide. The conditions of reaction were maintained as indicated in Example 3 and the product was worked up as described in Example 1, to yield 10-(3'-dimethylaminopropyl)phenothiazine.

Example 9

Following the procedure of Example 4, but using 241 grams of 2-acetyl phenothiazine and 275 ml. of a 4 normal solution of 2-dimethylaminoethyl chloride in toluene, one obtains 10-(2'-dimethylaminoethyl)-2-acetyl phenothiazine as a red oil distilling at 230 to 240° C. at approximately 0.5 mm. pressure. The acid oxalate, obtained in the form of yellow prisms, melted at 192 to 195° C. and after recrystallization at 196 to 198° C., with decomposition.

As stated earlier, the compounds as prepared by the novel process are useful in the field of therapeutics since they demonstrate, either as free bases or salts thereof, the actions previously noted. The compounds may be used in simple compositions with excipients in the form of tablets, capsules, powders or liquid compositions; or they may be used in combination with other medically active ingredients, as desired.

We claim:

1. The process comprising reacting a phenothiazine compound having the formula

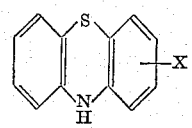

where X stands for a member of the group consisting of hydrogen, halogen, lower alkyl, —O·lower alkyl and —CO·lower alkyl with a halogenated alkylamine having the formula

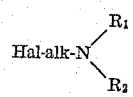

wherein "Hal" stands for a halogen atom of the group consisting of chlorine and bromine, "alk" represents a divalent lower alkylene radical having 2 to 4 carbon atoms and

stands for a member of the group consisting of di-(lower-alkyl)-amino, pyrrolidino and piperidino, the reaction being carried out at a temperature in the range of about 25° C. to about 80° C., in the presence of sodium hydride as a condensing agent and in a solvent medium of the group consisting of dimethyl formamide and a low-boiling aromatic hydrocarbon solvent containing at least about 10% by volume of dimethyl formamide.

2. The process comprising reacting a phenothiazine compound having the formula

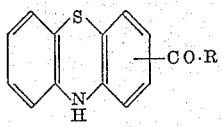

wherein R represents a lower alkyl, with a halogenated alkylamine having the formula $$Cl—alk—N(CH_3)_2$$

wherein "alk" stands for a lower alkylene radical having 1 to 4 carbon atoms, the reaction being carried out at a temperature in the range of about 25° C. to about 80° C. in an organic solvent of the group consisting of dimethyl formamide and a low-boiling aromatic hydrocarbon solvent containing at least about 10% by volume dimethyl formamide and in the presence of sodium hydride as the condensing agent.

3. The process of claim 2; wherein the organic solvent comprises dimethyl formamide in major amount.

4. The process of claim 3; wherein "alk" stands for the n-propylene radical.

5. The process comprising reacting phenothiazine with a halogenated alkylamine having the formula $$Cl—alk—N(CH_3)_2$$

wherein "alk" stands for a lower alkylene radical having 1 to 4 carbon atoms, the reaction being carried out at a temperature in the range of about 25° C. to about 80° C. in an organic solvent of the group consisting of dimethyl formamide and a low-boiling aromatic hydrocarbon solvent containing at least about 10% by volume dimethyl formamide and in the presence of sodium hydride as the condensing agent.

6. The process of claim 5; wherein the organic solvent comprises dimethyl formamide in major amount.

7. The process of claim 6; wherein "alk" stands for the n-propylene radical.

8. The process comprising reacting a phenothiazine compound having the formula

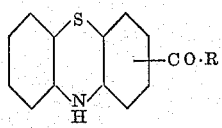

where R stands for a lower alkyl radical, with a halogenated alkylamine having the formula

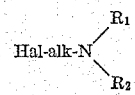

wherein "Hal" stands for halogen of the group consisting of chlorine and bromine, "alk" represents a divalent lower alkylene radical having 2 to 3 carbon atoms and

stands for a member of the group consisting of di-(lower-alkyl)amino, and a heterocyclic nucleus of 5 to 6 members having an imino nitrogen in the nucleus connected to "alk," the reaction being carried out in a solvent medium containing at least about 10% by volume of dimethyl formamide at a temperature from about 25° C. to about 80° C. and in the presence of sodium hydride as a condensing agent.

References Cited in the file of this patent

UNITED STATES PATENTS

| | | |
|---|---|---|
| 2,645,640 | Charpentier | July 14, 1953 |
| 2,767,179 | Cavallito et al. | Oct. 16, 1956 |
| 2,768,164 | Gailliot et al. | Oct. 23, 1956 |

FOREIGN PATENTS

| | | |
|---|---|---|
| 701,741 | Great Britain | Dec. 30, 1953 |
| 203,708 | Australia | Oct. 20, 1955 |

OTHER REFERENCES

Shaw: J. Am. Chem. Soc., vol. 76, March 5, 1954, pages 1384–1385.